3,660,463
SYNTHESIS OF AMINOMETHYLENE-
MALONONITRILE
Gerald Myer Jaffe, Verona, and William Richard Rehl, Upper Montclair, N.J., assignors to Hoffmann-La Roche Inc., Nutley, N.J.
No Drawing. Continuation-in-part of abandoned applications Ser. No. 406,591, Oct. 26, 1964, and Ser. No. 476,651, Aug. 2, 1965. This application Sept. 24, 1965, Ser. No. 490,105
Int. Cl. C07c *121/42*
U.S. Cl. 260—465.5
7 Claims

ABSTRACT OF THE DISCLOSURE

Aminomethylenemalononitrile is prepared by condensing a salt of formamidine with malononitrile in the presence of a weak base, said weak base being present in an amount of least about 0.5 mole per mole of malononitrile.

RELATED APPLICATIONS

This application is a continuation-in-part of application Ser. No. 476,651 filed Aug. 2, 1965 and now abandoned, and application Ser. No. 406,591 filed Oct. 26, 1964 also now abandoned.

This invention relates to a novel process for preparing intermediates useful in the synthesis of vitamin $B_1$. More particularly, it relates to a new and improved method for the preparation of aminomethylenemalononitrile via the condensation of formamidine and malononitrile.

The aminomethylenemalononitrile product of this process is a known chemical compound which can be used as an intermediate in a know method for the synthesis of vitamin $B_1$. Such method is described, for example, in among other places, U.S. Pat. No. 2,184,720, issued Dec. 26, 1939, to Matukawa. The formamidine and malononitrile starting materials are likewise known compounds which are commercially available.

One particular embodiment of the present invention comprises condensing formamidine and malononitrile in the presence of a condensing agent to produce aminomethylenemalononitrile. As condensing agent there can be employed any of the weak bases, either organic or inorganic. Suitable weak bases are, for example, ammonia, ammonium salts, e.g., ammonium carbonate, ammonium acetate, etc., weak acid salts of alkali metals such as, for example, alkali metal carbonates, e.g., sodium carbonate, potassium carbonate, etc.; alkali metal acetates, e.g., sodium acetate, potassium acetate, etc.; alkaline earth metal salts of weak acids, e.g., calcium carbonate, calcium acetate and the like; organic bases such as monoalkylamines, e.g., ethylamine, methylamine, etc., dialkylamines, diethylamine, methylethylamine, etc., trialkylamines, e.g., triethylamine, etc., ethylenediamine, and the like. Ammonia has been found to be an especially well-suited condensing agent for the preparation of aminomethylenemalononitrile by the process of this invention. The strong bases, for example, the alkali metal hydroxides, e.g., sodium hydroxide, potassium hydroxide, etc.; the alkali metal alcoholates, e.g., sodium methylate, sodium ethylate and the like are not suited for the condensation reaction of this invention. As solvent for the condensation reaction there can be employed any inert organic solvent. Preferably, the reaction is carried out in an alcoholic solvent such as a lower alkanol, e.g., methanol, ethanol, etc.; mixtures of these alcohols and the like. The reaction can also be carried out in other inert organic solvents such as, for example, hydrocarbons, e.g., benzene and the like. Alternatively, the reaction can be carried out without any solvent, for example, by dissolving the reactants in the condensing agents, for example, in liquid ammonia or in a liquid organic base.

The condensation can be conducted by simply mixing formamidine and malononitrile together with a weak base in an appropriate solvent and permitting them to react. The reactants can be used in any molar ratio but in order to obtain high yields of product the formamidine and malononitrile should be present in about a mole to mole ratio with the formamidine preferably being present in slight excess. It has also been found preferable to use at least about 0.5 mole of weak base per mole of malononitrile. In a preferred embodiment the condensation is effected with a molar ratio of formamidine:malononitrile 1.0–1.5:1.0 and with about 1.25 moles of weak base, preferably ammonia, per mole of malononitrile present in the reaction mixture.

The formamidine is suitably added to the reaction mixture in the form of a salt. As formamidine salts there can be employed any of the acid addition salts such as salts of the mineral acids, e.g., the halides, i.e., chloride, bromide, iodide, sulfate, phosphate, etc.; carboxylic acid salts such as acetate, etc.; sulfonic acid salts and the like.

The condensation reaction commences upon mixing of the reactants and, therefore, the reaction time is not critical. However, it has been found that optimum yields are obtained in the course of about 1 to 2.5 hours. The reaction can be conducted at room temperature or above or below room temperature. A preferred temperature range for the condensation reaction is from about $-10°$ C. to about $30°$ C.

In a preferred embodiment a formamidine salt, preferably the hydrochloride salt in alcoholic solution, is mixed with an alcoholic solution of malononitrile at room temperature. The reaction mixture is submitted to treatment with an excess of ammonia and cooled to a temperature in the range of about $0-10°$ C. The cool mixture is filtered to remove precipitated salts leaving an alcoholic solution of the aminomethylenemalononitrile product.

The alcoholic solution of aminomethylenemalononitrile obtained in the condensation process can be submitted directly to further treatment in the synthesis of vitamin $B_1$ or alternatively the condensation product can be further purified by any of a variety of purification techniques known to the art such as, for example, purification by extraction with ethyl acetate and water.

In another particular embodiment of the invention the condensation of formamidine and malononitrile can be effected by reacting a formamidine salt, e.g., formamidine HCl, with a cation exchange resin and treating the so-formed formamidine resin salt with malononitrile, thereby causing the formamidine to be simultaneously condensed with the malononitrile and removed from the exchange resin. In this method, the cation exchange resin is used as the reactor. The process is carried out in two steps, a specific embodiment of which can be traced with respect to the following reaction sequence:

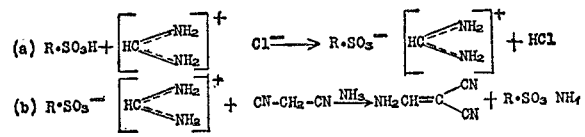

The symbol R in the above formulas represents an insoluble polymeric anion, i.e., the resin moiety of a sulfonic acid cation exchange resin.

Step (a) above is a loading operation wherein a solution of formamidine, as, for example, an alcoholic solution of formamidine, is treated with a cation exchange resin. The resin treatment is conveniently effected by passing the solution of formamidine through a cation exchange resin column. The formamidine remains on the column as a formamidine resinate salt while the impurities are washed out of the column along with the solvent. Excess acid formed during the operation can be removed by solvent wash. Additional solvent can, if desired, be used to wash the resin column following the loading operation. Resinous materials containing acidic groups such as sulfonic acid groups are suitably employed as the cation exchange resin in the above-described condensation process. Any insoluble sulfonated polymerizate of a polyvinylaryl compound can be used. It is ordinarily preferred to employ a resin of the styrene-divinylbenzene type which is characterized by the presence of the strongly acidic sulfonic acid group. Commercially available resins of this type which are suitable for the above-described condensation process are, for example, Amberlyst-15, Amberlite-IR 120, Amberlite 200 and Dowex 50 and the like. In loading the cation exchange resin with formamidine, it is desirable to continue the treatment with formamidine salt solution until the concentration of the formamidine in the resin reaches at least about 5 percent by weight and advantageously the loading can be continued until equilibrium is reached which, in the case of Amberlyst-15, occurs when the concentration of formamidine in the resin is about 16 percent by weight.

In step (b) the formamidine is removed from the resin as aminomethylenemalononitrile by condensing with malononitrile. The condensation is effected by treating the formamidine resinate salt from step (a) with malononitrile and weak base. The malononitrile and base are preferably dissolved in a suitable solvent such as, for example, alcohol or water. The condensation reaction is suitably conducted in an ion exchange column whereby a column containing cation exchange resin which has been treated with formamidine as described in step (a) above is eluted with an alcoholic solution of malononitrile and base. The aminomethylenemalononitrile product can be recovered from the eluate by conventional techniques such as, for example, by concentrating the solution and precipitating the product. The aminomethylenemalononitrile eluate is, however, suitable for direct utilization in the subsequent process steps for the vitamin $B_1$ synthesis.

The formamidine resin salt which is formed in the loading step of the above process is a novel product and thus constitutes a part of this invention. The novel formamidine resinates of this invention are the formamidine salts of sulfonic acid cation exchange resins. The anionic moiety of these novel resinates, i.e., the resin moiety, is an insoluble sulfonated polymer of a vinyl aromatic compound. More particularly, the anionic moiety is an insoluble sulfonated polymerizate of a mixture comprising a polyvinylaryl compound and a monovinylaryl compound. In one preferred embodiment the novel resinates of this invention comprise formamidine resinates of high density nuclear sulfonic-acid type cation exchange resins which have a polystyrene matrix cross-linked with about 8 percent divinylbenzene.

A particular formamidine resinate answering to the above description and which is useful in the preparation of aminomethylenemalononitrile is the formamidine resin salt of formamidine and Amberlyst-15. Amberlyst is a sulfonic type resin based upon a styrene-divinylbenzene copolymer made by the Rohm and Haas Co.

This invention will be more fully understood from the examples which follow. The examples are for illustrative purposes only and are not to be construed as limiting the invention in any sense.

EXAMPLE 1

Condensation of formamidine hydrochloride with malononitrile 1.5–2.0 moles of formamidine hydrochloride and 0.5 mole of ammonia were dissolved in methanol at room temperature. Then 1.0 mole of malononitrile was added. The mixture was stirred for about 1 hour at room temperature.

The condensation of formamidine hydrochloride and malononitrile was also carried out using the quantities of reactants and reaction conditions tabulated in Table I below.

| Initial reaction conditions | Formamidine-malononitrile mole ratio | Ammonia-malononitrile mole ratio |
|---|---|---|
| Time: | | |
| 55°, 10 hours | 1/1 | 4.4/1. |
| 55°, 1 hour | 1/1 | 3/1. |
| 55°, ¼ hour | 1/1 | 2.7/1. |
| Temperature: | | |
| 25°, 5 minutes | 1/1 | 2.7/1. |
| 0°, 1 hour | 1/1 | 2.7/1. |
| 80°, 10 hours | 1/1 | Excess ammonia.[1] |
| Reactants: | | |
| 6–24°, 1 hour | 2/1 | 1.26/1. |
| 24°, 1 hour | 1.5/1 | 0.5/1. |
| 55°, 10 hours | 1.5/1 | Excess ammonia.[1] |
| 55°, 10 hours | 2/1 | Do.[1] |

[1] As used in the table above and throughout this specification, the term "excess ammonia" comprehends any amount greater than one mole of ammonia per mole of malononitrile used in the condensation reaction.

EXAMPLE 2

Aminomethylenemalononitrile condensation

To an ethanolic solution of formamidine HCl and excess ammonia, cooled to −10 to 15° C., was added 6.6 g. malononitrile in 30 ml. ethanol over a 15 minute period. The solution was stirred at 15–22° C. for 2 hours. The suspension was cooled to 0–10° C. and filtered to remove ca. 5 grams ammonium chloride. The solids were washed with 5 × 25 ml. ethanol. The product yield was about 94 percent.

Similarly, 1.21 grams (0.015 mole) of formamidine hydrochloride in 25 ml. of ethanol (2B anhydrous) was reacted with 0.66 grams (0.01 mole) of malononitrile in the presence of 0.01 mole of the condensing agents tabulated below at 16–21° C. The reaction mixtures were worked up in the usual manner.

| Condensing agent: | Aminomethylenemalononitrile (percent of theory) |
|---|---|
| Sodium carbonate | 88.4 |
| Ammonium carbonate | 85.2 |
| Diethylamine | 94.7 |
| Triethylamine | 88.0 |

EXAMPLE 3

0.15 mole of formamidine acetate in 250 ml. of ethanol (2B anhydrous) was condensed with 0.1 mole of malononitrile in the presence of 0.2 mole of ethanolic ammonium solution at 15–20° C. for two hours. The reaction mixtures were worked up in the usual manner.

EXAMPLE 4

0.15 mole of formamidine dihydrophosphate in 250 ml. of ethanol (2B anhydrous) was condensed with 0.1 mole of malononitrile in the presence of 0.2 mole of ethanolic ammonia solution at 15–20° C. for two hours. The reaction mixture was worked up in the usual manner.

EXAMPLE 5

This example illustrates the condensation of formamidine hydrochloride and malononitrile using a cation exchange resin as the reactor.

Preparation of the resin column 170 g. dry Amberlyst-15 was suspended in methanol and placed in a column 25" long and 1" in diameter. The resin bed was washed with excess methanol. The column of the methanol washed resin occupied 220 ml.

Formamidine resinate step 19.3 g. crude formamidine hydrochloride containing about 2–3 percent ammonium hydrochloride was dissolved in 100 ml. methanol and passed through the resin. The resin column was washed with a total of 600 ml. methanol until the effluent contained no more impurities. There was thus obtained a formamidine resin salt containing about 10.5 grams of formamidine per 170 grams of dry resin.

The reaction of malononitrile with formamidine resinate

A mixture of 15.7 g. malononitrile dissolved in 65 ml. methanol and 35 ml. 6 N methanolic ammonia was passed through the column. 1000 ml. methanol were used to elute the product from the column. The effluents were combined and the solvent removed by distillation.

The solution containing this product was used directly in the synthesis of 2-methyl-4-amino-5-cyano-pyrimidine, an important intermediate in the synthesis of vitamin $B_1$.

We claim:

1. A process for the production of aminomethylenemalononitrile which comprises reacting, in the presence of a non-aqueous solvent and at a temperature of up to 80° C., malononitrile with a mineral acid addition salt or an acetic acid addition salt of formamidine in a molar ratio of acid addition salt to malononitrile of 1:1 to 1.3:1, said reaction being carried out in the presence of at least about 0.5 mole of a weak base per mole of malononitrile.

2. A method for the preparation of aminomethylenemalononitrile by a liquid phase reaction, which comprises treating a formamidine salt of a mineral acid or acetic acid with malononitrile in the presence of at least about 0.5 mole of a weak base per mole of malononitrile.

3. A method according to claim 2 wherein the weak base is selected from the group consisting of ammonia, ammonium salts, alkali metal salts of weak acids, alkaline earth metal salts of weak acids, monoalkylamines, dialkylamines, tri-alkylamines and ethylenediamine.

4. A method according to claim 3 wherein the process is carried out in a lower alkanol as solvent.

5. The method of claim 3 wherein the formamidine is added in the form of an acid addition salt of a mineral acid utilizing at least about one mole of formamidine per mole of malononitrile.

6. A process according to claim 5 wherein the solvent is ethanol.

7. A method for the preparation of aminomethylenemalononitrile by a liquid phase reaction, which comprises treating formamidine hydrochloride with malononitrile in the presence of ammonia wherein there is used at least about one mole of formamidine hydrochloride per mole of malononitrile and at least 0.5 mole of ammonia per mole of malononitrile, the reaction being carried out in ethanol as solvent at a temperature between about 10° C. and about 80° C. in the course of about 5 minutes to about 10 hours.

References Cited

Huffman et al., J. Org. Chem., vol. 27, pp. 551 to 558 (1962), QD–241–J6.

JOSEPH P. BRUST, Primary Examiner

U.S. Cl. X.R.

260—2.2